(12) United States Patent
Puvak et al.

(10) Patent No.: US 8,622,791 B2
(45) Date of Patent: Jan. 7, 2014

(54) CLEANING SHOE

(75) Inventors: Jared A Puvak, Moline, IL (US); Wesley Brands, Colona, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/284,507

(22) Filed: Oct. 28, 2011

(65) Prior Publication Data

US 2013/0109450 A1 May 2, 2013

(51) Int. Cl.
*A01F 12/32* (2006.01)

(52) U.S. Cl.
USPC ........................................................ 460/101

(58) Field of Classification Search
USPC ....................................................... 460/101
See application file for complete search history.

(56) References Cited

U.S. PATENT DOCUMENTS

| | | | |
|---|---|---|---|
| 2,419,691 A | 4/1947 | Shafer | |
| 2,500,448 A * | 3/1950 | Bozarth | 209/416 |
| 2,893,558 A * | 7/1959 | Zollinger | 209/254 |
| 3,345,116 A | 10/1967 | Hilton | |
| 3,497,274 A | 2/1970 | Yardley | |
| 3,977,740 A | 8/1976 | Struttmann | |
| 4,253,471 A * | 3/1981 | Klimmer | 460/97 |
| 4,411,437 A | 10/1983 | Conti | |
| 4,687,351 A | 8/1987 | Martinie | |
| 4,723,558 A * | 2/1988 | Usick | 460/93 |
| 4,736,753 A * | 4/1988 | Glaubitz et al. | 460/9 |
| 4,770,190 A * | 9/1988 | Barnett | 460/102 |
| 4,863,415 A * | 9/1989 | Carnewal et al. | 460/101 |
| 5,536,090 A | 7/1996 | Nisley | |
| 6,579,172 B2 * | 6/2003 | Lauer | 460/101 |
| 6,843,719 B1 * | 1/2005 | Sacquitne | 460/101 |
| 7,771,260 B2 * | 8/2010 | Ricketts et al. | 460/9 |
| 2005/0282601 A1* | 12/2005 | Duquesne et al. | 460/101 |
| 2008/0004092 A1* | 1/2008 | Nelson et al. | 460/101 |
| 2010/0016044 A1* | 1/2010 | Adamson et al. | 460/101 |

FOREIGN PATENT DOCUMENTS

| | | |
|---|---|---|
| DE | 1 2009000797 A1 | 8/2010 |
| EP | 2 45530 A2 | 1/2010 |

* cited by examiner

*Primary Examiner* — Thomas B Will
*Assistant Examiner* — Mai Nguyen

(57) ABSTRACT

A cleaning shoe (102) for an agricultural combine comprises a cleaning shoe frame (200); a first plurality of hangers (104) supporting the cleaning shoe frame (200) on the body; a sieve (212) disposed within the cleaning shoe frame (200); two rods (216, 218) supported on the cleaning shoe frame (200), wherein each rod is constrained to pivot about a fore-and-aft axis with respect to the cleaning shoe frame (200); and a second plurality of hangers (214) supported on the rods and coupled to the sieve (212) to support the sieve (212) and constrain the sieve (212) to reciprocate in a lateral direction with respect to the cleaning shoe frame (200).

13 Claims, 3 Drawing Sheets

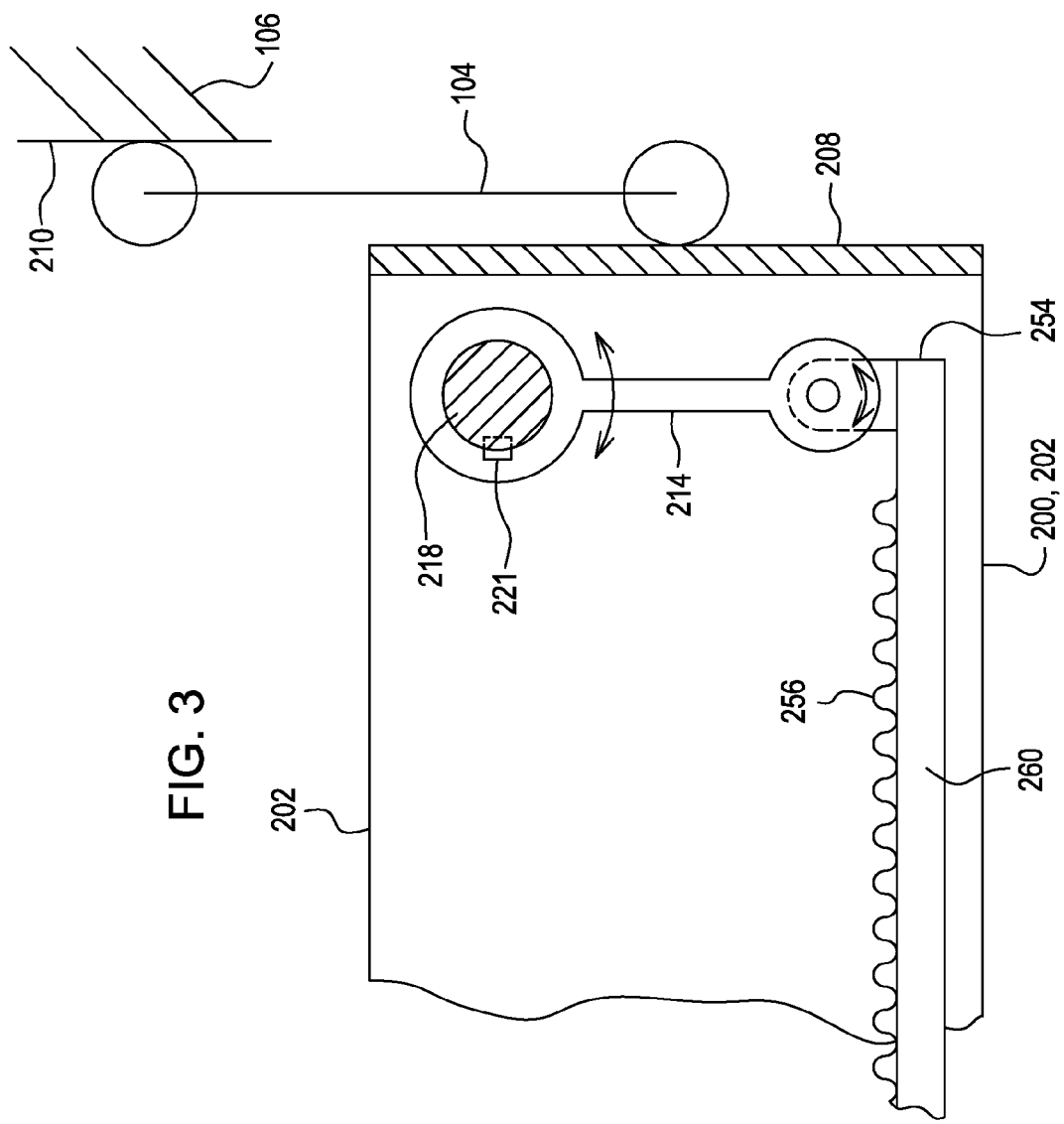

CLEANING SHOE

FIELD OF THE INVENTION

The invention relates to a cleaning shoe for an agricultural combine. More particularly, it relates to a cleaning shoe having a sieve supported for lateral movement.

BACKGROUND OF THE INVENTION

It is important to evenly distribute harvested crop material across a sieve in a cleaning shoe. Uneven distribution of crop material can reduce the capacity of the cleaning shoe and increase grain loss.

In EP2145530(A2), a cleaning shoe is suspended for fore and aft movement and also is permitted to move laterally. Various means of support are provided to achieve lateral as well as fore-and-aft movement.

In DE 102009000797 (A1), a cleaning shoe is coupled to an oscillating weight that can rotate about a generally vertical axis to produce two dimensional movement in a plurality of directions lying in a horizontal plane.

The arrangements above permit both fore-and-aft and lateral movement of the sieve with respect to the agricultural combine. However, in none of the arrangements is the sieve supported in the cleaning shoe for convenient removal.

It is an object of this arrangement to provide a sieve adapted for convenient removal from the cleaning shoe while still providing both fore-and-aft and lateral movement of the sieve.

SUMMARY OF THE INVENTION

A cleaning shoe frame is supported on a first plurality of hangers for fore-and-aft movement with respect to the body or chassis of an agricultural combine. The cleaning shoe frame supports two fore-and-aft extending rods, each rod being disposed on an opposing side of the cleaning shoe frame. The rods include a second plurality of hangers, each hanger having a proximal end which is fixed to the rod and having a distal end which is coupled to and supports a sieve.

The forward portion of each rod is supported in a front receiver that is fixed to a forward portion of the cleaning shoe frame. The rear portion of the rod is supported in a rear receiver that is fixed to a rear portion of the cleaning shoe frame.

Each of the plurality of rods is supported by its front and rear receivers such that it is rotatable about its longitudinal axis. The front and rear hangers of each rod are fixed to that rod such that when the rod rotates about its longitudinal axis, the distal end of the hangers moves laterally.

In accordance with one aspect of the invention, a cleaning shoe for an agricultural combine having a body is provided that comprises a cleaning shoe frame; a first plurality of hangers supporting the cleaning shoe frame on the body; a sieve disposed within the cleaning shoe frame; two rods supported on the cleaning shoe frame, wherein each rod is constrained to pivot about a fore-and-aft axis with respect to the cleaning shoe frame; and a second plurality of hangers supported on the rods and coupled to the sieve to support the sieve and constrain the sieve to reciprocate in a lateral direction with respect to the cleaning shoe frame.

The cleaning shoe may further comprise forward bearing mounts disposed on the cleaning shoe frame and coupling a forward portion of the rods to the cleaning shoe frame, wherein the forward bearing mounts constrain the rods to pivot about their respective longitudinal axes at forward ends of the rods. It may further comprise rear bearing mounts disposed on the cleaning shoe frame and coupling a rear portion of the rods to the cleaning shoe frame, wherein the rear bearing mounts constrain the rods to pivot about their respective longitudinal axes at rear ends of the rods. A forward end of each rod may be configured to slidingly engage its corresponding forward bearing mount by movement of said each rod in a forward direction, and further wherein the rods are prevented by the rear bearing mounts from moving rearward and sliding out of the forward bearing mounts. The second plurality of hangers may extend generally downward from the two rods and may be coupled to the sieve underneath a pivotal axis of the two rods.

In accordance with a second aspect of the invention, a cleaning shoe for an agricultural combine having a body is provided comprising a cleaning shoe frame; a plurality of fore-and-aft reciprocating supports coupled to the body and to the cleaning shoe frame and on which the cleaning shoe frame is suspended inside the body; a generally planar sieve disposed generally horizontally within the cleaning shoe frame; two elongate members extending generally in a fore-and-aft direction, wherein each of the two elongate members is mounted on the cleaning shoe frame for rotational movement with respect to said cleaning shoe frame about a generally horizontal and fore-and-aft extending axis of rotation; and a plurality of laterally reciprocating supports coupling the sieve to each of the two elongate members, whereby the sieve is constrained to laterally reciprocate in a horizontal plane with respect to the cleaning shoe frame.

The cleaning shoe may further comprise forward bearing mounts disposed on the cleaning shoe frame and coupling a forward portion of the two elongate members to the cleaning shoe frame, and the forward bearing mounts may constrain the two elongate members to pivot about their respective longitudinal axes at forward ends of the two elongate members. The cleaning shoe may further comprise rear bearing mounts disposed on the cleaning shoe frame and coupling a rear portion of the two elongate members to the cleaning shoe frame, and the rear bearing mounts may constrain the two elongate members to pivot about their respective longitudinal axes at rear ends of the two elongate members. A forward end of each elongate member may be configured to slidingly engage its corresponding forward bearing mount by movement of said each elongate member in a forward direction, and the two elongate members may be prevented by the rear bearing mounts from moving rearward and sliding out of the forward bearing mounts.

In accordance with a third aspect of the invention, a cleaning shoe for an agricultural combine having a body is provided comprising a cleaning shoe frame suspended in the body on a plurality of hangers that constrain the cleaning shoe frame to pivot fore-and-aft; and a sieve supported in the cleaning shoe frame on sieve mounts, wherein the sieve mounts are configured to engage and disengage the sieve from the cleaning shoe frame by respective forward and rearward translation of the sieve with respect to the cleaning shoe frame while the cleaning shoe is suspended in the body of the agricultural combine.

The sieve mounts may include at least two forward bearing mounts that engage and support a front portion of the sieve to a front portion of the cleaning shoe frame when the front portion of the sieve is translated forward in the cleaning shoe frame. The sieve mounts may include at least two rear bearing mounts that engage and support a rear portion of the sieve to a rear portion of the cleaning shoe frame. The cleaning shoe may comprise generally horizontal and longitudinally extending left and right sidewalls disposed at respective left and right sides of the cleaning shoe, and the at least two rear bearing mounts may be removably fastened to rear portions of the left and right sidewalls. The rear bearing mounts may prevent the front portion of the sieve from being released from the cleaning shoe frame when the rear bearing mounts are fixed to the left and right sidewalls, and the rear bearing mounts may permit the front portion of the sieve to be released from the cleaning shoe frame when said rear bearing mounts are unfixed from the left and right sidewalls.

BRIEF DESCRIPTION OF THE DRAWINGS

FIG. 3 is a partial cross-sectional rear view of the cleaning shoe of FIGS. 1 and 2 taken at section line 3-3 in FIG. 2.

DETAILED DESCRIPTION OF THE PREFERRED EMBODIMENTS

The terms "front", "forward", and the like, refer to the forward direction of travel of the agricultural harvester in which the cleaning shoe is installed. "Aft", "rear", "rearward", "backward" and the like refer to the direction opposite to forward direction of travel. "Fore-and-aft", "front-to-rear" and similar terms refer to a direction parallel to the forward direction of travel but movement in either a forward direction (forward or front) or the opposite direction (aft or rear). "Lateral", "side-to-side", "transverse", "side-to-side" and similar terms refer to a direction that is generally horizontal and perpendicular to the forward direction of travel.

"Sieve" as it is used herein refers to a planar screen-like device configured to pass grain downward therethrough while simultaneously passing air upward therethrough in order to separate the grain from lighter non-grain material such as chaff, plant stalks, husks and the like.

Figure 1:
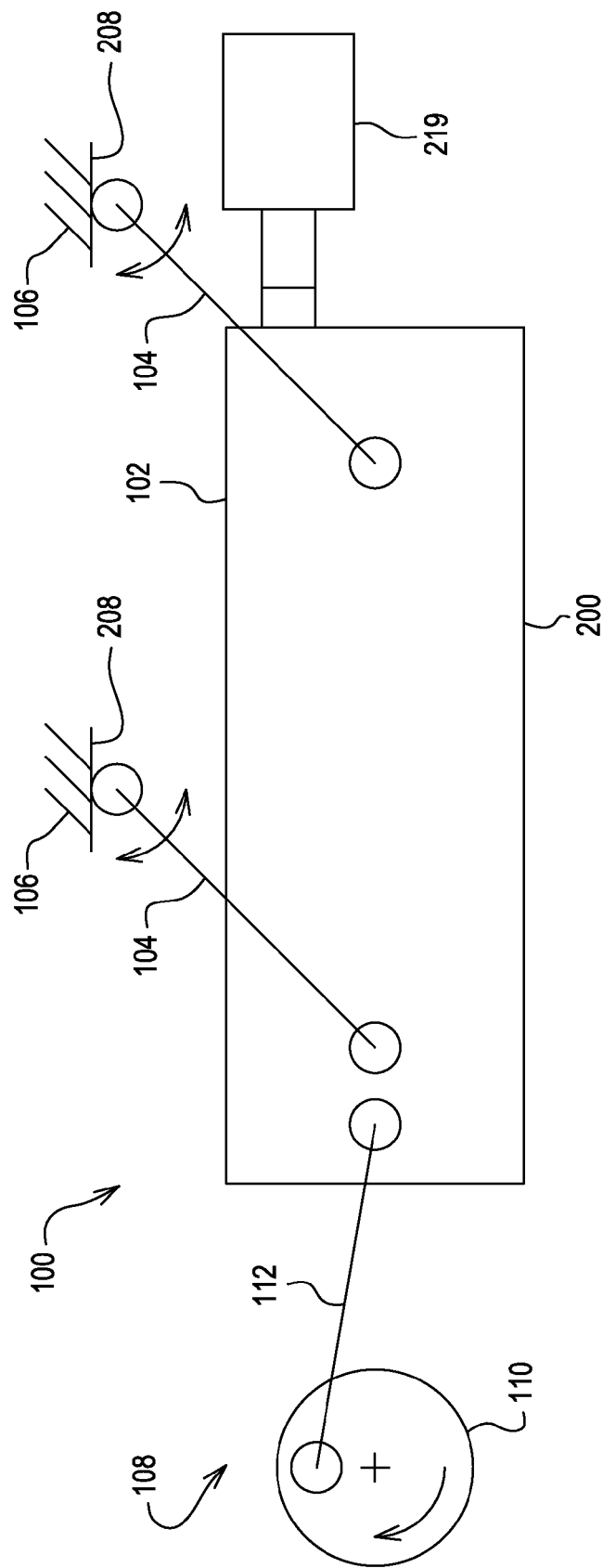
FIG. 1 is a side view of a cleaning shoe in accordance with the present invention.

Referring to FIG. 1, a cleaning shoe arrangement 100 of an agricultural combine is disclosed. The arrangement 100 includes a cleaning shoe 102 that is supported on a plurality of hangers 104 that are pivotally coupled at their proximal ends to the cleaning shoe 102 and are pivotally coupled at their distal ends to a body or chassis 106 of the agricultural combine. The hangers constrain the cleaning shoe to pivot in a fore-and-aft direction.

A driver 108 drives the cleaning shoe in fore-and-aft reciprocating movement, shaking the cleaning shoe in a fore-and-aft direction to assist the sieving of crop material (not shown) that is poured into the cleaning shoe. In this embodiment, the driver 108 includes a rotary motor 110 to which a proximal end of a crank arm 112 is coupled. The crank arm 112 is pivotally coupled to the rotary motor in a position offset from the rotational axis of the motor. This causes the distal end of the crank arm 112 to drive the cleaning shoe in reciprocating movement in a fore-and-aft direction. The distal end of the crank arm 112 is pivotally coupled to the cleaning shoe 102. The cleaning shoe reciprocates fore-and-aft in a generally horizontal plane. It is constrained in its movement by the plurality of hangers 104.

Figure 2:
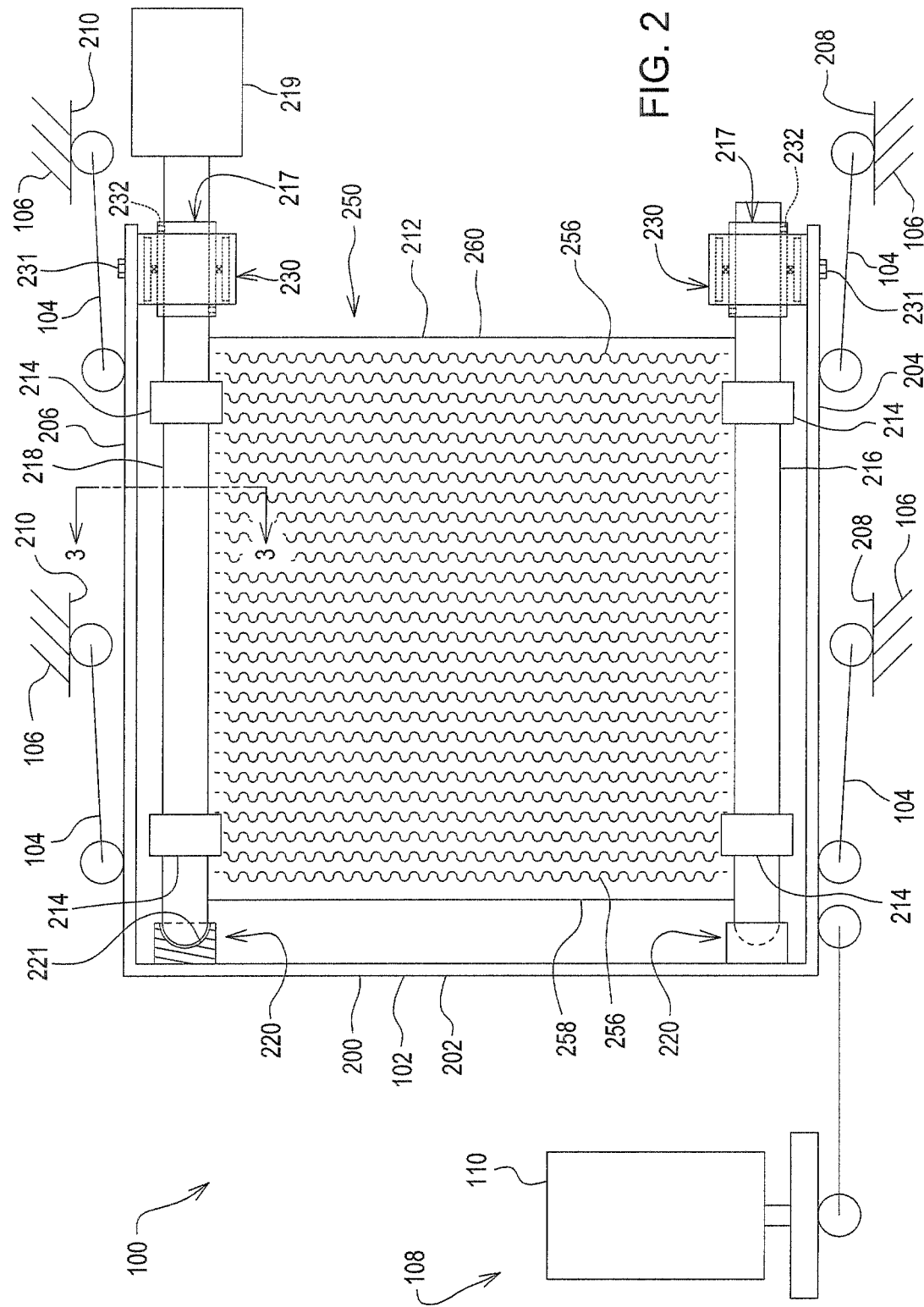
FIG. 2 is a plan view of the cleaning shoe of FIG. 1, with one of two front bearing mounts being shown in section.

Referring to FIG. 2, the cleaning shoe is comprised of a cleaning shoe frame 200 that is generally U-shaped in plan view having a generally laterally and horizontally extending front member 202, a left-side sidewall 204 and a right-side sidewall 206 that extend longitudinally and vertically. The left and right sidewalls 204, 206 of the cleaning shoe 102 are disposed just inside left and right opposing sidewalls 208, 210 of the agricultural combine.

A sieve 212 is supported on a plurality of hangers 214. Hangers 214 are pivotally coupled to the left and right sides of sieve 212 at the proximal ends of the hangers 214. Hangers 214 are fixed to left and right side rods 216, 218 at the distal ends of the hangers 214. The hangers 214 constrain the sieve to pivot transversely with respect to the cleaning shoe frame when the rods 216, 218 oscillate about the respective longitudinal axes of the rods 216, 218.

The sieve 212 includes a sieve frame 250 generally in the form of a rectangular box having a left side, a right side 254, a front side 258 and a rear side 260 that support a plurality of laterally extending slats 256 of conventional design.

The left and right side rods 216, 218 are disposed at the left and right sides of sieve 212. The left and right side rods 216, 218 are preferably disposed either just above or just below the sieve 212 such that the hangers 214 extend generally downward from the rods 216, 218 to the sieve 212, as shown herein, and hence the proximal ends of the hangers 214 are preferably directly below the rotational axis of the rod 216, 218 to which the hanger 214 is fixed, or such that the hangers 214 extend generally upward from the rods to the sieve 212 and hence the proximal ends of the hangers 214 are preferably directly above the rotational axis of the rods to which the hanger 214 is fixed, respectively.

The left and right side rods 216, 218 are disposed generally fore-and-aft and horizontally and pivot about fore-and-aft extending horizontal axes that are parallel to each other and are also disposed in a generally horizontally extending plane. While described as "rods" herein, both in the specification and in the claims, the term as used herein encompasses any generally horizontal and fore-and-aft extending elongate structure of regular or irregular cross section. The plurality of hangers 214 are of generally equal length, and thus maintain the sieve in a generally horizontal plane that is parallel to the plane defined by the left and right side rods 216, 218.

Each of rods 216, 218 has two hangers 214 that are spaced apart from each other along the length of the rod. The forward hangers 214 on the rods 216, 218 support the front portion of sieve 212 and the rear hangers 214 on the rods 216, 218 support the rear portion of sieve 212.

The hangers 214 are fixed to rods 216, 218 with keys, splines, pins, or similar devices 221 such that when the rods rotate about their longitudinal axes, the rotational movement is communicated to the hangers 214 and the hangers 214 also rotate about the rotational axes. The hangers are preferably fixed to the left and right side rods 216, 218, such that they cannot move with respect thereto. When one of rods 216, 218 is oscillated about its longitudinal axis, it drives both hangers 214 in an oscillating side-to-side motion. In the embodiment shown herein, an oscillating motor 219 is shown coupled to the right side rod 218 to drive the right side rod in rotary oscillating motion about the longitudinal axis of right side rod 218. The front and rear hangers 214, which are coupled at their lower ends to the sieve 212, drive the sieve 212 in the same side-to-side motion. The side-to-side motion of the sieve 212 then drives the front and rear hangers 214 on the opposite side of the sieve in a side-to-side motion, which drives the rod 216, 218 on the opposite side of the sieve 212 in an oscillating or reciprocating motion about its longitudinal axis. In this way, the entire sieve can be evenly and consistently driven in lateral (i.e. side-to-side) oscillations by driving just one of the rods 216, 218.

The sieve 212 can be readily removed from the cleaning shoe frame 200 for repair or replacement. The front ends of the rods 216, 218 are each supported in a front bearing mount 220 that is fixed to the front member 202 of the cleaning shoe frame. The front bearing mounts 220 are of a quick connect type and each defines a rearwardly opening receptacle 221 permitting the operator to mount and dismount the front ends of rods 216, 218 by sliding the sieve assembly comprising the sieve 212, hanger 214 and rods 216, 218 forward into the U-shaped cleaning shoe frame 200 from the rear of the cleaning shoe frame, and inserting the front ends of rods 216, 218 into the rearwardly opening receptacles of the front bearing mounts 220. The front bearing mounts 220 support the front ends of the rods 216, 218 and constrain the rods 216, 218 to pivot about their respective longitudinal axes.

Once inserted, the operator then lifts the rear of the rods 216, 218 into position and attaches rear portions or of the rods 216, 218 to the rear left side and rear right side, respectively, of the cleaning shoe frame 200. The rear portions of the rods 216, 218 are supported for pivoting movement on rear left and rear right side locations of the cleaning shoe frame 200 by inner races of rear bearings 217 contained in rear bearing mounts 230 including housings that are releasably fixed as by fasteners 231, to the rear left and rear right side locations of the cleaning shoe frame, respectively. The inner races of the bearings 217 are fixed, as by fasteners 232, to the rear portions of the rods 216, 218 so as to prevent the forward ends of the rods 216, 218 from moving rearward and sliding out of the forward bearing mounts when the rear portions of the rods 216, 218 are attached to the cleaning shoe frame 200 with the respective rear bearing mounts 230.

Removal of the sieve 212 is performed by executing the same procedure in is reverse order: the rear bearing mounts 230 are respectively released from the rear left and rear right side locations of the cleaning shoe frame 200, permitting the operator to slide the sieve assembly, which includes the rods 216, 218 rearward. This rearward movement disconnects the forward ends of the rods 216, 218 from the front bearing mounts 220. This releases the sieve 212 from the cleaning shoe frame and permits the sieve 212 to be withdrawn rearward out of the cleaning shoe frame 200.

This arrangement permits the operator to remove, repair and replace the sieve quickly and easily by the expedient of unfastening the rear of the rods 216, 218 from the cleaning shoe frame and sliding the sieve rearward and out of the cleaning shoe frame.

The invention claimed is:

1. A cleaning shoe (102) for an agricultural combine having a body 106) comprising:
   a cleaning shoe frame (200) having opposite, transversely spaced, fore-and-aft extending sidewalls (204, 206);
   a first plurality of hangers (104) supporting the cleaning shoe frame (200) on the body (106) for fore-and-aft movement relative to said body;
   a sieve (212) disposed between the sidewalls (204, 206) of the cleaning shoe frame (200);
   two fore-and-aft extending, parallel, transversely spaced rods (216, 218) being, supported on the cleaning shoe frame (200), wherein each rod is constrained to pivot about a fore-and-aft axis with respect to the cleaning shoe frame (200); and a second plurality of hangers (214), with some having first ends constrained to pivot with a first of said two rods, and with others having first ends constrained to pivot with a second of said two rods, and with all of said second plurality of hangers having second ends coupled to the sieve (212) to support the sieve (212) and constrain the sieve (212) to reciprocate in a lateral direction with respect to the cleaning shoe frame (200) together with oscillating pivotal movement of said two rods.

2. The cleaning shoe (102) of claim 1, wherein two forward bearing mounts are disposed on the cleaning shoe frame (200) and respectively couple a forward portion of the two rods to the cleaning shoe frame (200) for constraining the rods to pivot about their respective longitudinal axes.

3. The cleaning shoe (102) of claim 2, further comprising two rear bearing mounts disposed on the cleaning shoe frame (200) and coupling a rear portion of the rods to the cleaning shoe frame (200), wherein the two rear bearing mounts respectively cooperate with the two forward bearing mounts to constrain the two rods to pivot about their respective longitudinal axes.

4. The cleaning shoe (102) of claim 3, wherein a forward end of each rod is configured to slidingly engage its corresponding forward bearing mount by movement of said each rod in a forward direction, and further wherein the two rear bearing mounts are configured to prevent the rods from moving rearward relative to the rear bearing mounts and sliding out of the forward bearing mounts.

5. The cleaning shoe (102) of claim 1, wherein said some of the second plurality of hangers (214) extend downward from said first of the two rods (216, 218) and are coupled to the sieve (212) underneath the longitudinal axis of the first of the two rods, and wherein others of said plurality of hangers (214) extend downward from said second of the two rods (216, 218) and are coupled to the sieve (212) underneath the longitudinal axis of the second of the two rods (216, 218).

6. A cleaning shoe (102) for an agricultural combine having a body (106) comprising:
   a cleaning shoe frame (200) having opposite longitudinally extending sidewalls (204, 206);
   a plurality of fore-and-aft reciprocating supports (104) coupled to the body (106) and to the cleaning shoe frame (200) and on which the cleaning shoe frame (200) is suspended from the body;
   a generally planar sieve (212) disposed generally horizontally between the opposite sidewalls (204, 206) of the cleaning shoe frame (200);
   two elongate members (216, 218) extending generally in a fore-and-aft direction, wherein the two elongate members (216, 218) are respectively mounted on the cleaning shoe frame (200) for rotational movement with respect to said cleaning shoe frame (200) about two generally horizontal and fore-and-aft extending axes of rotation;
   a plurality of laterally reciprocating supports (214) coupling the sieve (212) to each of the two elongate members (206, 208), whereby the sieve (212) is constrained to laterally reciprocate in a generally horizontal plane with respect to the cleaning shoe frame (200).

7. The cleaning shoe (102) of claim 6, further comprising two forward bearing mounts (220, 220) disposed on the cleaning shoe frame (200) and respectively coupling a forward portion of the two elongate members f206, 208) to the cleaning shoe frame (200), wherein the forward bearing mounts (220, 220) constrain the two elongate members to pivot about their respective longitudinal axes.

8. The cleaning shoe (102) of claim 7, further comprising two rear bearing mounts (230, 230) disposed on the cleaning shoe frame (200) and respectively coupling a rear portion of each of the two elongate members (206, 208) to the cleaning shoe frame (200), wherein the rear bearing mounts cooperate with the front bearing mounts to constrain the two elongate members to pivot about their respective longitudinal axes.

9. The cleaning shoe (102) of claim 8, wherein a forward end of each elongate member is configured to slidingly engage its corresponding forward bearing mount by movement of said each elongate member in a forward direction, and further wherein the two elongate members are prevented by the rear bearing mounts from moving rearward and sliding out of the forward bearing mounts.

10. A cleaning shoe (102) for an agricultural combine having a body (106), comprising:
    a cleaning shoe frame (200) suspended from the body by on a plurality of hangers (104) that constrain the cleaning shoe frame (200) to oscillate fore-and-aft;
    a sieve assembly (212, 214, 216, 218) constructed to move fore-and-aft as a unit and including a sieve (212) having opposite, parallel, fore-and-aft extending, first and second sides, with the sides respectively being coupled to fore-and-aft extending, first and second front member portions (216, 218) and to fore-and-aft extending, first and second rear member portions (216, 218);
    two front sieve mounts (220) respectively having rearwardly opening receptacles in which front ends of said first and second front member portions are slidably received, and two rear sieve mounts (230) respectively releasably securing said first and second rear member portions to the cleaning shoe frame (200) and being configured so as to prevent rearward movement of the sieve assembly relative to the front sieve mounts (220), whereby the sieve assembly (212, 214, 216, 218) can be detached from the cleaning shoe frame (200) by first disconnecting the rear sieve mounts (230) from the cleaning shoe frame (200) and then by moving the sieve assembly rearwardly so as to disengage the first and second front member portions (216, 218) from the front sieve mounts (220).

11. The cleaning shoe (102) of claim 10, wherein the front and rear sieve mounts (220, 230) are front and rear bearing mounts (220, 230) that engage and support the front and rear member portions for rotation about their respective longitudinal axes.

12. The cleaning shoe (102) of claim 11, wherein said first front and rear member portions each are each defined by a fore-and-aft extending, elongate first member (216, 218) having front and rear ends respectively located forward and rearward of said sieve (212), and wherein said second front and rear member portions are each defined by a fore-and-aft extending, elongate second member (216, 218) having front and rear ends respectively located forward and rearward of said sieve (212); and further including a plurality of supports, some of which have first ends coupled for pivoting together with the elongate first member, others of which have first ends coupled for pivoting together with the elongate second member, and all of which have second ends pivotally attached to the sieve;
    and an oscillating drive motor coupled to the rear end of one of said elongate first and second members.

13. The cleaning shoe (102) of claim 11 wherein the cleaning shoe frame (200) comprises generally horizontal and longitudinally extending left and right sidewalls disposed at respective left and right sides of the cleaning shoe, and further wherein the rear bearing mounts are removably fastened to rear portions of the left and right sidewalls.

* * * * *